Feb. 3, 1942. G. A. RUBISSOW 2,271,663
THROTTLE ACTUATING DEVICE
Filed Sept. 6, 1940 2 Sheets-Sheet 1
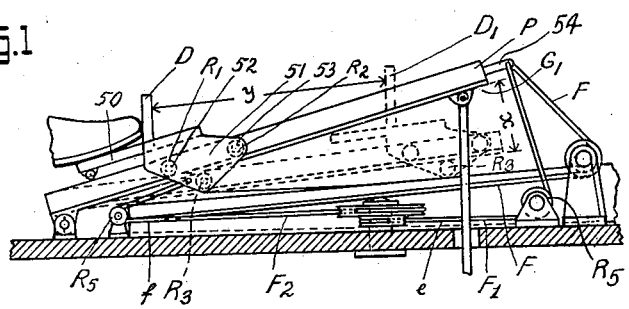
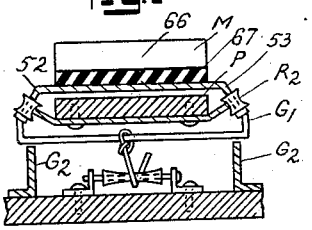
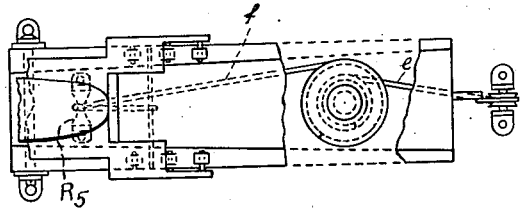
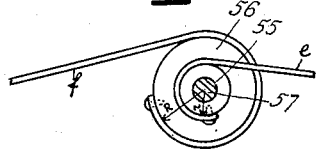
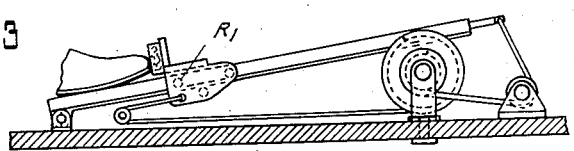
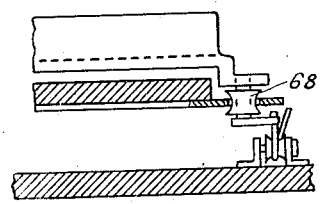
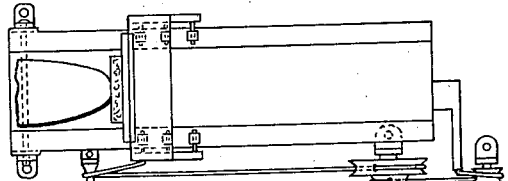
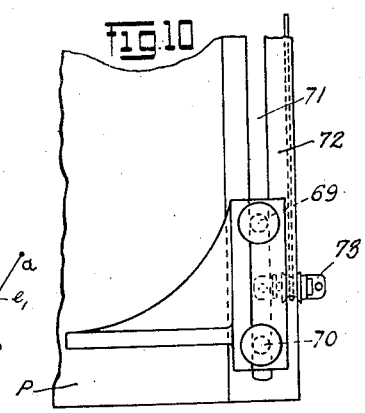
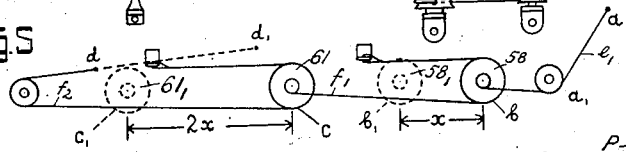
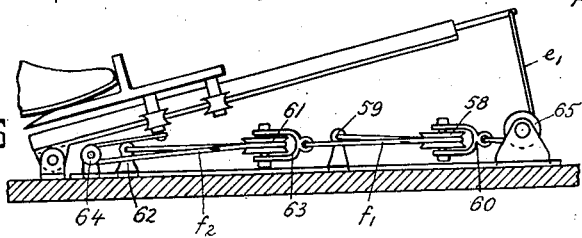
INVENTOR.
George A. Rubissow.

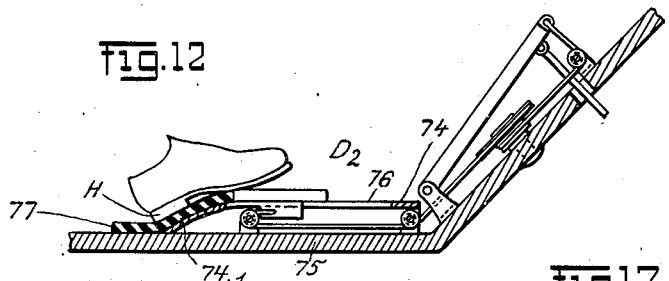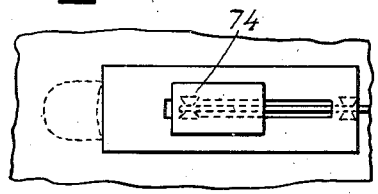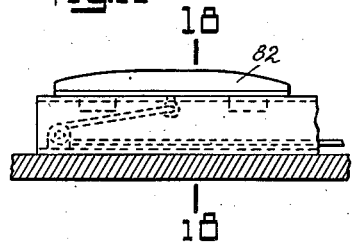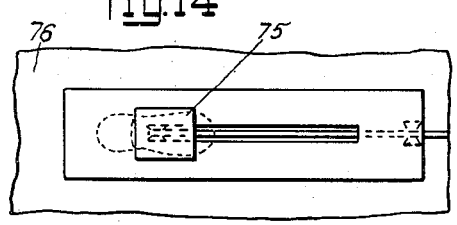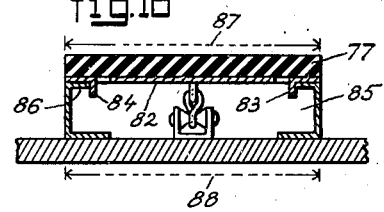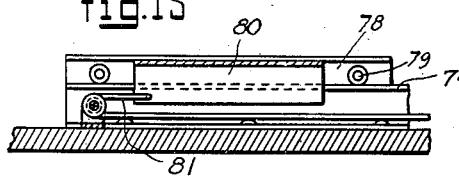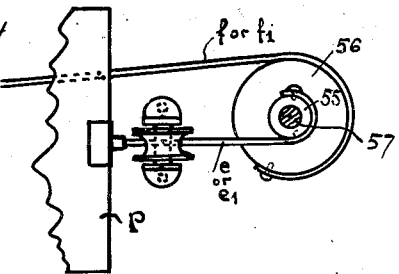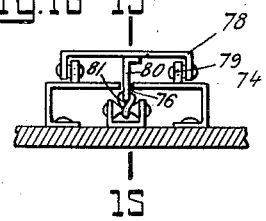

Patented Feb. 3, 1942

2,271,663

UNITED STATES PATENT OFFICE 2,271,663

THROTTLE ACTUATING DEVICE

George A. Rubissow, New York, N. Y.

Application September 6, 1940, Serial No. 355,586

10 Claims. (Cl. 74—513)

Several improvements have been made to provide a device which can be used in combination with the throttle of an automobile and, in particular, in combination with the accelerator pedals, such as are now used in the modern vehicle.

This invention provides a still further improvement which will more fully appear from the following description when the same is read in connection with the accompanying drawings and the appended claims. It is to be expressly understood, however, that the drawings are for purposes of schematical illustration only and are not intended as a definition as to the design or to the limits of the several aspects of this invention.

All figures represent different aspects of this invention in simplified and diagrammatical form of illustration. In the drawings wherein like reference characters refer to like parts throughout the several views:

Figures 1 and 3 are longitudinal side-views of two different embodiments of this device mounted on an accelerator pedal.

Figures 2 and 4 are plan-views of Figures 1 and 2.

Figure 5 is a schematical diagrammatical view of one embodiment.

Figure 6 is a longitudinal side-view of the device using the method of Figure 5.

Figure 7 is a cross-sectional view of another embodiment similar to that illustrated on Figure 1.

Figures 8 and 8a represent a plan-view with parts broken out of a double-pulley.

Figure 9 represents cross-sectional view of another embodiment of the device and the accelerator pedal with parts broken out.

Figure 10 is a plan-view of Figure 9.

Figure 11 is a cross-sectional view with parts broken out of a guiding-means.

Figure 12 is a longitudinal side-view of another embodiment of the device.

Figure 13 is a plan-view of Figure 12.

Figure 14 is a longitudinal side-view of another embodiment of this device.

Figure 15 is a longitudinal side-view of another embodiment of this device.

Figure 16 is a cross-sectional view of Figure 15.

Figure 17 is a longitudinal side-view of another embodiment.

Figure 18 is a cross-sectional view of Figure 17.

One embodiment of this invention consists in providing the accelerator pedal P, with a guide-means G1 rigidly affixed to the said pedal, guide-means G2 rigid with respect to the floor and a pusher member D, operatively interconnecting the accelerator pedal with the guide-means G1 or G1 and G2. The pedal may be of any shape or size. It may be round or as illustrated on Figures 1, 2 and 3.

For the convenience of the description, a strip-like shaped pedal will be depicted in all drawings, but it is not to be construed as limiting this invention to the embodiment thereof. Various embodiments herein described may be affixed on any shape of pedal, for instance, round or ovular, a pedal pivoted by a front or rear axle, or pivoted on an axle below the floor of the car.

The guide-means G1 may be affixed to the pedal P by mechanical means such as screws, balls, clips, or by glue or cement, or it may be one piece with the pedal or be the pedal itself, having a suitable surface which can be considered as serving for or substituting for the said guide-means G1. The shape of the guide-means G1 may be a straight line as shown on Figures 1, 2, 3 and 4.

A pusher-member D may consist, for instance, of a member 50 and flanges 51 bent or extending downwards, on which flanges are mounted preferably two axles 52, i. e. preferably at least one axle on each flange, on which axle or axles rollers R1 are freely rotatable, as illustrated in Figures 1, 2, 3 and 4. Instead of flanges, members can be employed, themselves forming axles.

Another guide-means G2 is mounted rigidly in respect to the floor and has a contour which is suitable for rolling or sliding thereon the aforementioned pusher-member D. The pusher-member D also may be provided, if desired, with guide-means R3, preferably rollers, to prevent the downward pressure of the accelerator pedal produced by the weight of the foot, thus permitting the foot to rest without any pressure on the pusher-member.

A flexible connection F is attached by one end to the support 54 affixed rigidly to the pedal P, and by passing through the roller R4 (or guide-means) and roller R5, it operates pusher-member D. Such arrangement will pull the pedal P downwards for a distance X, Figure 1, as soon as pusher-member D is pushed forwards for the same distance X.

In the case that the pusher-member D takes the position D1 with its longitudinal displacement Y be greater than the vertical downward displacement X of the pedal, then a double-pulley 55 and 56 is used, as shown on Figures 1, 2, 3, 4, and 8. Instead of being in one piece the flexible connection F, is made of two pieces e attached to the pedal P and to the pulley 55, and $f$ attached to the larger pulley 56 and to the pusher-member D. The radius R of 56 is greater than the radius $r$ of 55. 56 and 55 are rigid in respect to each other and both rotate on a common axis 57.

The axis 57 of the double-pulley may be affixed perpendicular to the floor, as shown on Figures 1 and 2, or horizontal in respect thereto, Figures 3 and 4, or at any desirable angle. Instead of a fixed axis 57 and double-pulley 55—56, a system of movable train-pulleys 58 and 61 may be used, when mounted on frames 60 and 63. The flexible connection $e_1$ Figures 5 and 6 passing through roller (or guide-means) 65, is affixed to the frame 60. The flexible connection $f_1$ is affixed to a support 59 and after passing through the pulley 58 is then affixed to the frame 63. The flexible connection $f_2$ is affixed to a support 62 and after passing through the pulley (or roller) 61, passes through a roller (or guide-means) 64 and is thereafter affixed to the pusher-member D. When the pulley 58 makes a displacement of X and takes the position $58_1$, Figure 5, the pulley 61 makes a displacement of 2.X and takes the position $61_1$.

Such devices as shown on Figures 1, 2, 3, 4, 5, 6 and 8 offer the desired differentiation of the force necessary to actuate the accelerator pedal. Thus, the pusher-member, when pushed to and fro, actuates the throttle. The pusher-member D may be mounted, as illustrated on Figures 7, 9, 10, and 11, or Figures 1, 2, 3, 4 and 6. If desired, D may also roll on a guide-means $G_2$ especially provided therefor (preferably on both sides of the pedal).

Pusher-member D may have arresting means 66, on which a sponge-rubber 67 or other friction-augmenting material is affixed.

Roller 68, 69 or 70, mounted on their respective axles rigid with pusher-member D, may roll or slide in a guiding slot 71 provided in a frame 72. The axis of the roller 69, Figures 10 and 11, may be provided with an element 73 to which the flexible connection F or $f_1$, or $f_2$, may be affixed.

Another embodiment is shown on Figures 12 to 18, wherein the pusher-member D is not mounted on the pedal P but on a special guide-member 74 rigid in respect to the floor 75. $D_2$ and guide-member 74 may be flat or of any suitable curved surface. The guide-member 74 may be provided with a slot 76 through which the pusher-member D is attached to the flexible connection, and in which slot the pusher-member is guided accordingly when pushed to and fro. The floor 75 and, eventually, the outer part 74, of the guide member 74 may be covered with friction-augmenting (or diminishing) means 77. Pusher-member 78, Figures 15 and 16, may be provided with roller 79 (or rollers) which roll on support 74, and with a guiding-element 80, passing through the slot 76, and to which element 80 the flexible connection 81 is attached.

The pusher-member 82, Figures 17 and 18, may be covered by vibration-diminishing means and also by friction-augmenting means 77. It may also be provided with two downward-extending guiding-flanges 84, 84, which slide easily on the flanges of the guide-means 85, 86, especially provided therefor.

The pusher 82 may have a fixation-means in its center, to which the flexible connection may be attached. The width 87 Figure 18 may be equal to the width 88 of the pusher 82, or may be much smaller than 88. The contact surfaces between the pusher 82 and the flanges 85—86 may be polished and/or oiled in order to offer less friction. The flexible connection may be a cord, a wire, a chain, a belt, a caterpillar-chain, or the like.

Instead of placing the pulley or the double-pulley below the throttle as illustrated in Figures 2 and 4, it can be provided at one side of the throttle or in front of as shown in Figure 8a, wherein the pulleys operate exactly in the same manner as shown in Figures 2 and 8, but are situated in the rear of the accelerator pedal. Thus they do not occupy any space below the pedal. The fixation means through which the flexible connection $e$ or $e_1$ are affixed to the pedal, may be of any shape or form.

Device D and its component parts, may be made of metal, wood, glass or any suitable plastic, or a suitable combination thereof. If desired, this device and its component parts may be cast, stamped or pressed out.

Having now particularly described and ascertained the nature of the said invention and in what manner the same is to be performed, I declare that what I claim is:

1. In combination with the accelerator pedal of a vehicle, a guide-means rigidly affixed in respect to the said accelerator pedal, a pusher-member provided on the said accelerator pedal, a flexible connection operatively interconnected with the said accelerator pedal and the said pusher-member, whereby when the said pusher-member is pushed to and fro, the said accelerator pedal is actuated.

2. In combination with the accelerator pedal of a vehicle, a first guide-means rigidly affixed in respect to the floor, a second guide-means rigidly affixed in respect to the said accelerator pedal, a flexible connecting means consisting of a first flexible connection, one end of which is affixed to the said accelerator pedal and the other rigidly affixed to the periphery of a first pulley passing on its way through at least one guide-element preferably a roller, a second flexible connection one end of which is rigidly affixed to the periphery of a second pulley, said second pulley rigid and co-axial with the said first pulley, the other end of said other flexible connecting means passing through one guide-means, preferably a roller, attached to a pusher-member which is guided on the said first guide-means preferably through the intermediary of at least one roller, and when said pusher-member is pushed to and fro contacting the second guide-means, said first and second flexible connections are each moved in proportion to the diameters of their respective pulleys, whereby the accelerator pedal is operated.

3. In combination with the accelerator pedal of a vehicle, a first guide-means rigidly affixed in respect to the floor, a second guide-means rigidly affixed in respect to the said accelerator pedal, a first flexible connecting means consisting of a first flexible connection, one end of which is affixed to the said accelerator pedal and the other end rigidly affixed to the periphery of a first pulley passing on its way through at least one guide-element preferably a roller, a second flexible connecting means, one end of which is rigidly affixed to the periphery of a second pulley, said second pulley rigid and preferably coaxial with the said first pulley, the other end of said other flexible connecting means passing through one guide-means which is guided on the said first guide-means preferably through the intermediary of a roller attached to a pusher-member which is guided on the said first guide means preferably contacting the said second guide means through the intermediary of at least one roller, whereby when said pusher-member is pushed to and fro contacting the second guide-means, said first and said second flexible connecting means are each moved in proportion to the diameters of their respective pulleys, the diameter of the said second pulley being sufficiently larger than the diameter of the said first pulley, and the accelerator pedal is accordingly actuated.

4. In combination with the accelerator pedal of a vehicle, a first guide-means rigidly affixed in respect to the floor, a second guide-means rigidly affixed in respect to the said accelerator pedal, a flexible connecting means one end of which is attached to the said accelerator pedal, the said flexible connection passing through at least one pulley placed in the vicinity of the said end of the said flexible connecting means and at least through one other pulley placed in the vicinity of the other end of the said flexible connecting means, the said other end of the said flexible connecting means being affixed to a pusher-member provided preferably with roller contacting the said first guide-means, whereby when pushing to and fro the said pusher-member, the accelerator pedal is operated accordingly.

5. A device as set forth in claim 2 wherein instead of one group of pulleys composed of the said first and said second pulleys, more than one of such groups is employed operatively interconnected one with the other by suitable flexible means of the character referred to.

6. In combination with the accelerator pedal of a vehicle, a first guide means rigidly affixed in respect to the floor, a second guide means rigidly affixed in respect to the said accelerator pedal, a pusher-member provided on the said accelerator pedal to displace itself substantially along it and provided with guides operatively interconnecting the said first and second guide means, at least one flexible connecting means operatively interconnecting the said pedal and the said pusher, one end of the said flexible connecting means attached to the said pedal and the other end to the said pusher, at least one guide preferably a roller and at least one pulley provided for the said flexible connecting means.

7. In combination with the accelerator pedal of a vehicle, at least two guides rigidly affixed in respect to the floor, a to and fro sliding pusher member mounted on a support affixed rigidly in respect to the said floor, a flexible connecting means composed of at least two flexible connections, one end of said flexible connecting means attached to the said pedal and the other end to the said pusher, said two flexible connections being operatively interconnected through at least two pulleys provided therefor, whereby when the said pusher is pushed to and fro the throttle of the said vehicle is accordingly actuated.

8. In combination with an accelerator pedal of a vehicle, a first guide means rigidly affixed to the said accelerator pedal, a second guide means rigidly affixed in respect to the floor, a pusher-member provided on the said accelerator pedal, said pusher-member provided with guides capable of contacting simultaneously the said first and second guide-means, a flexible connection operatively interconnected with the said accelerator pedal and the said pusher-member, whereby when the said pusher-member is pushed to and fro, the said accelerator pedal is actuated.

9. In combination with the accelerator pedal of a vehicle, a first guide-means rigidly affixed in respect to the floor, a second guide-means rigidly affixed in respect to the said accelerator pedal, a flexible connecting means consisting of two flexible connections, the first of said flexible connections having its one end affixed to the said pedal and its other end to the frame of a pulley, said first flexible connection passing on its way through a guide rigidly affixed in respect to the floor, said second flexible connection being affixed by its one end to a member rigid with the floor and by its other end attached to a pusher-member provided on the said accelerator pedal, which is guided on the said first and second guide means preferably through the intermediary of at least one roller, said second flexible connection passing on its way through a guide affixed rigidly in respect to the floor, whereby when the said pusher-member is pushed to and fro contacting the said first and second guide means, said first and second flexible connections are each moved in proportion to the diameters of their respective pulleys and the accelerator pedal is actuated.

10. In combination with the accelerator pedal of a vehicle, at least two guides rigidly affixed in respect to the floor, a to and fro sliding pusher member mounted on a support affixed rigidly in respect to the said floor, a flexible connecting means composed of at least one flexible connection, one end of said flexible connecting means attached to the said pedal and the other end to the said pusher, said flexible connection being operatively interconnected through at least the said two guide means, whereby when the said pusher is pushed to and fro the throttle of the said vehicle is accordingly actuated.

GEORGE A. RUBISSOW.